United States Patent [19]

Walter et al.

[11] Patent Number: 5,710,851
[45] Date of Patent: Jan. 20, 1998

[54] STRAIN RELIEF SYSTEM FOR A FIBER OPTIC CONNECTOR

[75] Inventors: Eric Walter, Westchester, Ill.; Donald W. Duda, Williams Bay, Wis.; Wenzong Chen, Darien; Eric Repta, Schaumburg, both of Ill.

[73] Assignee: Amphenol Corporation, Wallingford, Conn.

[21] Appl. No.: 553,895

[22] Filed: Nov. 6, 1995

[51] Int. Cl.⁶ ............................................. G02B 6/36
[52] U.S. Cl. ....................... 385/86; 385/76; 385/100; 385/139
[58] Field of Search ........................ 385/86, 76, 139, 385/69, 75, 87, 88, 100, 102, 109

[56] References Cited

U.S. PATENT DOCUMENTS

| | | | |
|---|---|---|---|
| 3,984,174 | 10/1976 | Landgreen | 350/96 C |
| 4,209,227 | 6/1980 | Dubos et al. | 350/96.22 |
| 4,652,082 | 3/1987 | Warner | 350/96.2 |
| 4,834,487 | 5/1989 | Abendschein et al. | 350/96.2 |
| 4,848,870 | 7/1989 | Wisecarver et al. | 350/96.21 |
| 4,978,194 | 12/1990 | Allen et al. | 350/96.23 |
| 5,016,970 | 5/1991 | Nagase et al. | 385/96.21 |
| 5,037,175 | 8/1991 | Weber | 385/76 |
| 5,052,768 | 10/1991 | Matumoto et al. | 385/76 |
| 5,073,044 | 12/1991 | Egner et al. | 385/86 |
| 5,094,552 | 3/1992 | Monroe et al. | 385/76 |
| 5,096,276 | 3/1992 | Gerace et al. | 385/76 |
| 5,138,678 | 8/1992 | Briggs et al. | 385/86 |
| 5,181,267 | 1/1993 | Gerace et al. | 385/86 |
| 5,181,272 | 1/1993 | Hopper | 385/139 |
| 5,293,582 | 3/1994 | Beard et al. | 385/78 |
| 5,329,603 | 7/1994 | Watanabe et al. | 385/86 |
| 5,347,603 | 9/1994 | Belenkiy et al. | 385/86 |
| 5,461,690 | 10/1995 | Lampert | 385/86 X |

*Primary Examiner*—Phan T. H. Palmer
*Attorney, Agent, or Firm*—Bacon & Thomas

[57] ABSTRACT

A strain relief system for a fiber optic connector includes a boot made up of two halves, the halves being fitted together by press-fit pins supported by a flange which also serves increase the rigidity of the boot. The boot is held in place on the cable by using internal ribs at an distal from the connector. The force required to make the ribs hold the boot in place is provided by stretching a standard elastomeric boot over the outer diameter of the section containing the ribs. The system further incorporates a support clip at the connector end to assist the two halves in staying together and further resist lateral bending moments. The outer profile of the support clip can be adapted to fit a variety of different connector configurations, and thus the support clip also serves as an adapter for the strain relief system.

31 Claims, 6 Drawing Sheets

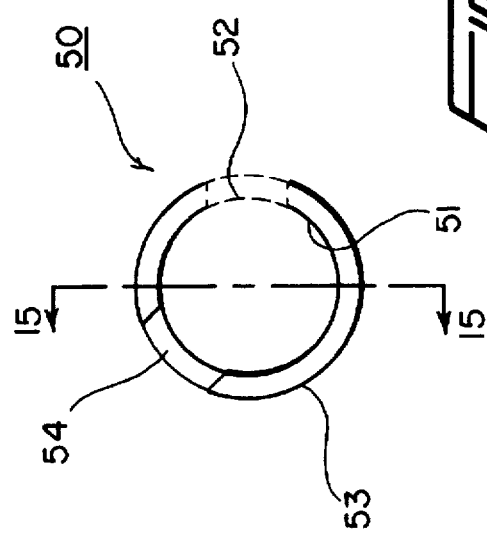
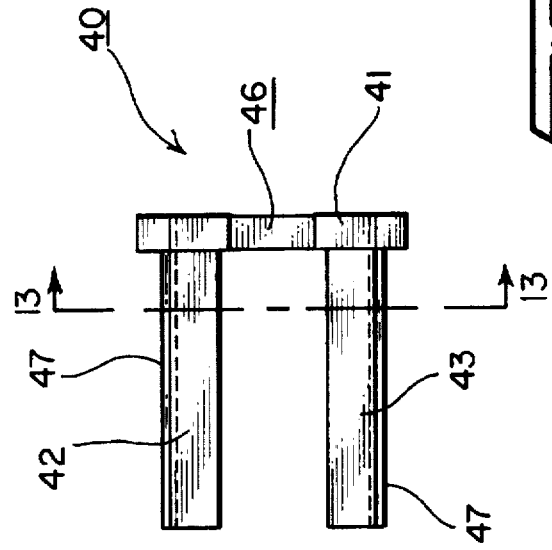
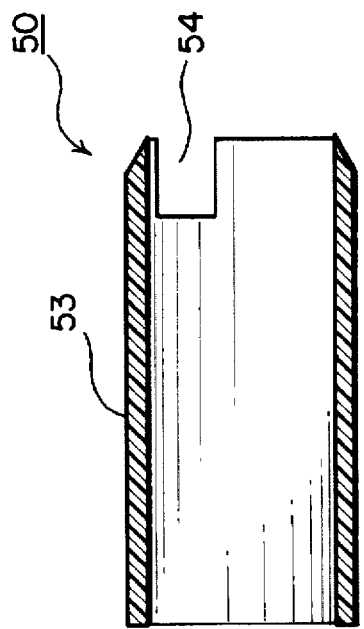
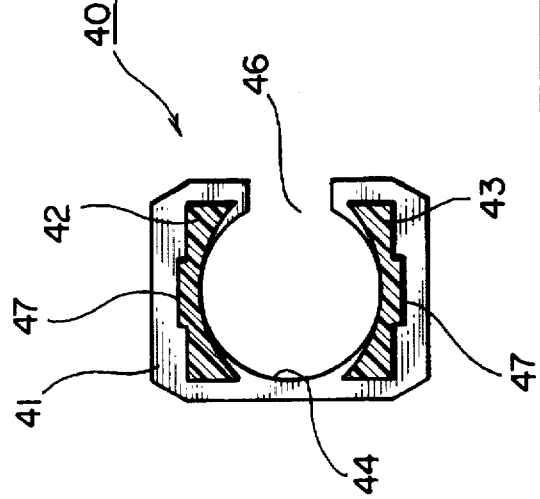

5,710,851

STRAIN RELIEF SYSTEM FOR A FIBER OPTIC CONNECTOR

BACKGROUND OF THE INVENTION

1. Field of the Invention

This invention relates to the field of cable connections and, in particular, to a right angle cable strain relief system suitable for use in fiber optic connectors.

2. Description of Related Art

Fiber optic connectors are currently used in a variety of applications requiring joining optical fiber cables to devices such as transmitters and receivers, or to other optical fiber cables. A number of different optical fiber connector types are commercially available, as are a variety of strain relief systems.

The problem of strain relief is especially critical in fiber optic installations, in contrast to electrical wiring installations, because the optical properties of the fiber are especially sensitive to overstressing and kinking of the cable. A variety of optical fiber connector strain relief systems have consequently been proposed, commonly referred to as "right angled" systems, for the purpose of providing extra support for the fiber, particularly where the fiber is to be bent as it leaves the connector. Examples of prior strain relief systems for optical fiber connectors include those disclosed in U.S. Pat. Nos. 5,347,603, 5,329,603, 5,138,678, 5,094,552, 5,073,044, and 4,652,082. These strain relief systems are all intended to replace standard resilient boot based strain relief systems for applications where the fiber is to be bent as it leaves the connector.

Although a number of right angled strain relief systems have been proposed to prevent kinking of the fiber as it exits the connector, it is still common in most installations to use as the strain relief a resilient boot similar to those used in electrical installations. The conventional resilient boot is inexpensive and provides adequate strain relief where there is sufficient space for the cable to exit the connector substantially linearly and the cable is unlikely to be stressed to critical curvature.

Because both the standard resilient boot and their proposed replacements are assembled to the cable and/or connector before the fiber is terminated to the connector, it is impossible to change from one system to the other without cable re-termination. Thus a field technician must be equipped with both types of system if he or she wishes to have available the most appropriate strain relief for all situations.

Although it might in theory be desirable to use a boot of the type described in the above-cited patents in every fiber optic connector installation, it is simply impractical to do so because such replacement requires cutting the cable in order to remove the existing connector and strain relief. Because of the inconvenience and cost of replacing existing strain relief systems with those described in the above-cited patents, conventional resilient boots will continue to be used in many installations which would otherwise benefit from improved strain relief designs.

While boots have been proposed which have a variable angle, such boots are in general relatively expensive and still cannot be retrofitted onto an existing connector installation, if only because the boot is in one piece and therefore must be threaded onto the cable before the cable is attached to the connector. At present, none of the boots which have so far been proposed is capable of such retrofitting.

Even in situations where retrofitting of the boot is not necessary because the cable has not yet been terminated to the connector, or because the cable is being replaced, present boot designs are inadequate in that they are not adaptable for different connectors, as a result of which a field technician must carry complete boots for each of the types of connector that he is likely to encounter, rather than stocking a relatively smaller number of basic boots and a larger number of inexpensive adapters. At present, none of the boots which have so far been proposed has provided a standardized boot design useable with a variety of different connector configurations, including connectors having both circular and square cross-sections.

A need therefore exists to provide a strain relief system that can be retrofitted, preferably without special tools or skills, onto an existing fiber optic connector installation without the need to disassemble the cable from the connector, or to replace the cable and connector. In addition, a need exists for a strain relief system having a standardized boot design useable with a variety of different boot configurations by means of a simple adapter member.

SUMMARY OF THE INVENTION

It is accordingly an objective of the invention to provide a strain relief system for a cable connection, and in particular for a fiber optic cable connection, in which a conventional flexible strain relief boot can be upgraded to a more rigid boot, such as a "right angle" boot, by retrofitting the boot onto a cable which has already been attached to a connector, without the need for removal of the cable from the connector or complete replacement of the cable and connector.

It is a further objective of the invention to provide a strain relief system for a cable connection, and in particular for a fiber optic cable connection, which can be installed in situ without the need for special tools or sells, and which is adaptable to a variety of connector configurations.

It is a still further objective of the invention to provide a strain relief system which can be retrofitted onto an existing fiber optic connector installation without degrading the signal carrying properties of the cable.

It is yet another objective of the invention to provide a strain relief system for fiber optic cables that can be used with a variety of different connector configurations, and which includes a clip member having an outer profile adapted to the type of connector with which the strain relief is to be used and arranged to hold together two halves of the strain relief boot.

These objectives are achieved by providing a strain relief system which includes an improved strain relief boot made up of two halves and an attachment or clip member which serves both to secure the boot to the connector and to clamp one end of the boot to the cable, the other end of the boot being clamped to the cable by means of the standard resilient boot of a pre-existing strain relief installation.

In an especially preferred embodiment of the invention, the improved strain relief boot includes a flange supporting a press-fit arrangement for securing together the two halves of the boot and a passage defining a curvature of the fiber and ridges extending into the passage which squeeze the jacket of the cable and prevent axial movement of the boot relative to the cable after assembly of the boot onto the cable, the penetration pressure being supplied by stretching the pre-existing strain relief boot over the end of the first boot. The clip member used to secure the improved strain relief boot to the connector preferably has a generally C-shaped profile to permit the member to be fitted over the cable, and an exterior shape which corresponds to the shape of the rear opening of the connector coupling member or outer housing.

The preferred strain relief system may be assembled onto an existing installation by fitting the two halves of the preferred rigid boot around a cable which has already been attached to the connector, fitting the clip member over one end of the rigid boot and inserting the retention member and one end of the rigid boot into the rear opening of the connector, and then sliding the pre-existing resilient boot over the other end of the rigid boot to cause ridges in the rigid boot to penetrate the cable jacket and secure the boot to the cable and the two halves of the boot to each other.

By utilizing a separate clip member, the present invention has the advantage of permitting the same standardized boot design to be used with a variety of different connector configurations, even in situations where retrofitting is not required. In such situations, the clip serves to hold the two halves of the boot together and also functions as an adapter, with the outer profile of the clip being arranged to correspond to the inner profile of a connector into which the boot is to be fitted. For example, the clip may have a rectangular outer profile or a circular outer profile. It will be appreciated by those skilled in the art that in order to serve as an adapter, the clip need not be arranged to snap onto an existing cable, but rather may have a continuous outer profile.

Further features and advantages of the invention will become apparent from the following description of a preferred embodiment of the invention, although it will be appreciated by those skilled in the art that variations and modifications of the specific embodiment disclosed could be made without departing from the spirit and scope of the invention.

BRIEF DESCRIPTION OF THE DRAWINGS

FIG. 6 is a cross-sectional view taken along section A—A of FIG. 2.

FIG. 12 is a side view of a boot clip for use in the preferred strain relief system.

FIG. 13 is a cross-sectional view taken along line C—C of FIG. 12.

FIG. 14 is an alternative boot clip for use in the preferred strain relief system.

FIG. 15 is a cross-sectional view taken along line D—D of FIG. 14.

DETAILED DESCRIPTION OF THE PREFERRED EMBODIMENTS

Figure 1:
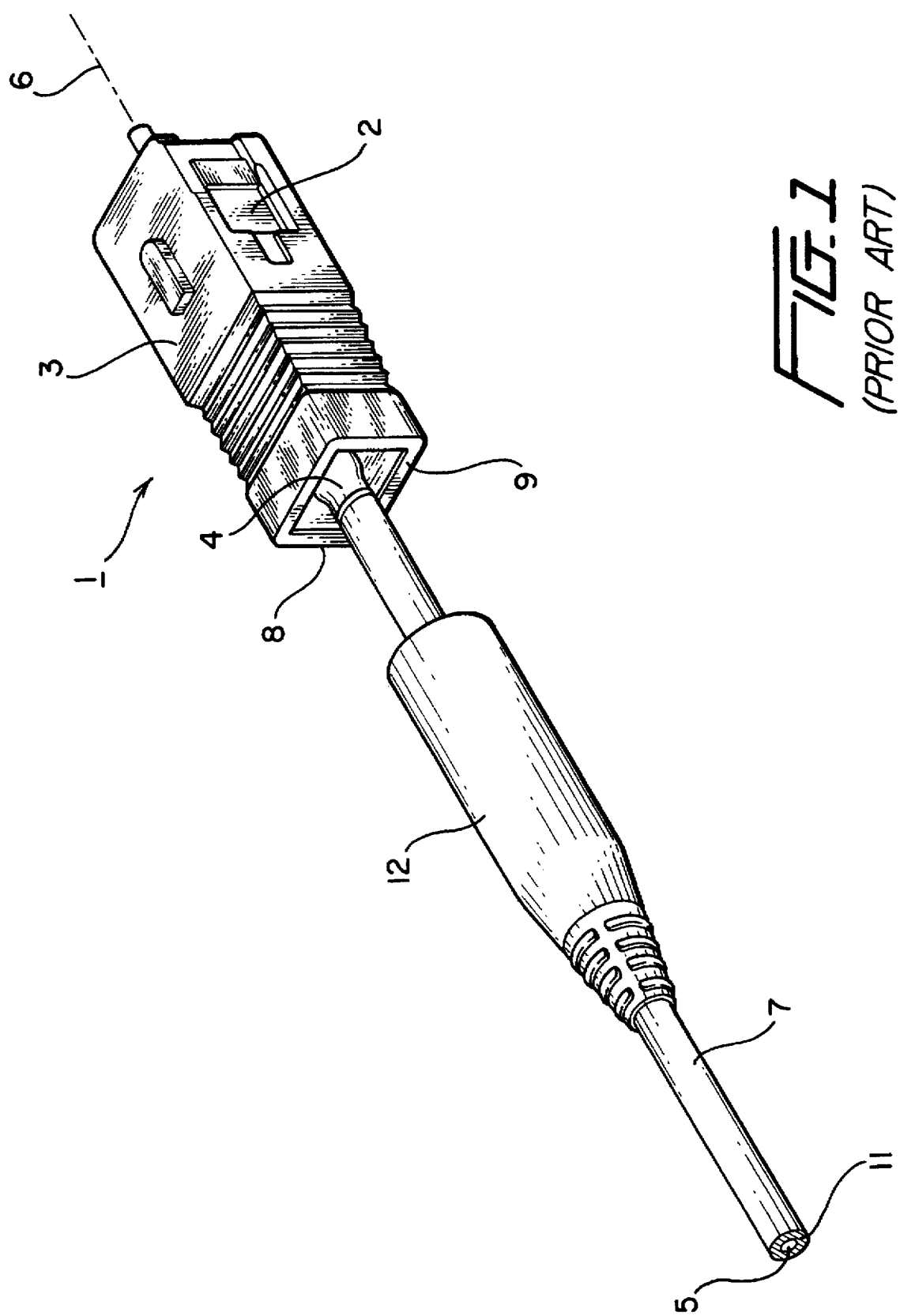
FIG. 1 is a perspective view of a conventional optical fiber connector with a standard elastomeric boot, to which the strain relief system of the present invention is to be retrofitted.
Figure 2:
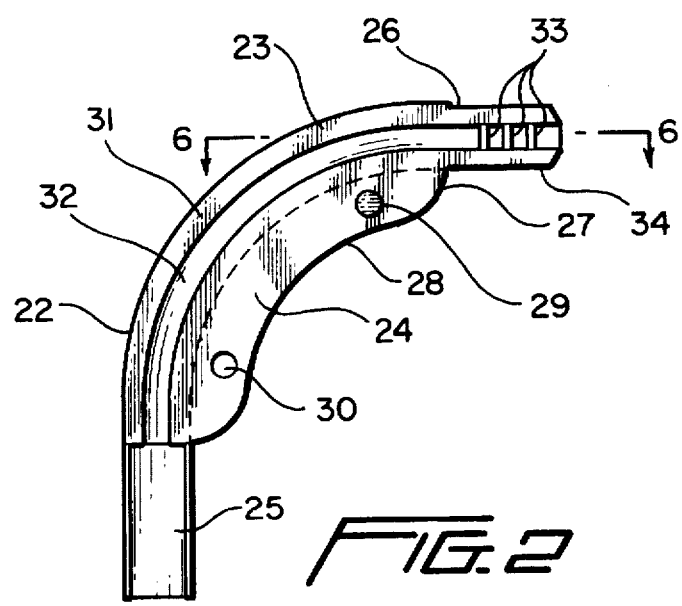
FIG. 2 is a plan view of a first half of a boot adapted for use in the strain relief system of the preferred embodiment of the invention.
Figure 4:
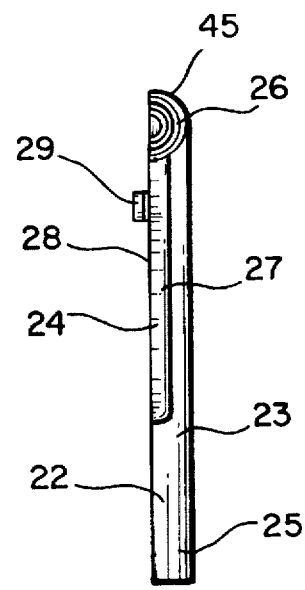
FIGS. 4 and 5 are side views of the boot half illustrated in FIGS. 2 and 3.
Figure 5:
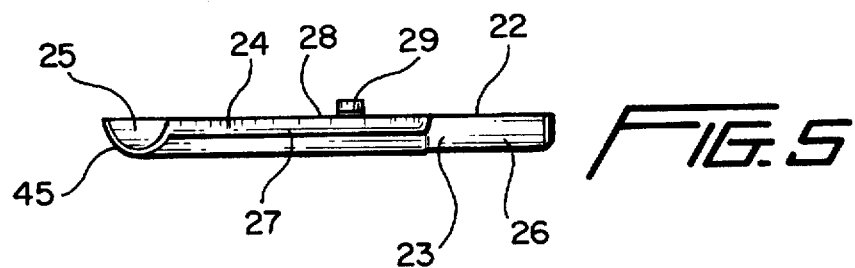
Figure 3:
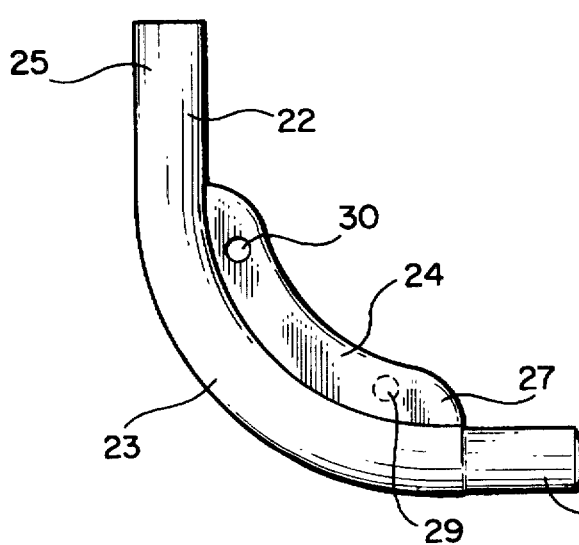
FIG. 3 is a plan view of an opposite side of the boot half illustrated in FIG. 2.
Figure 8:
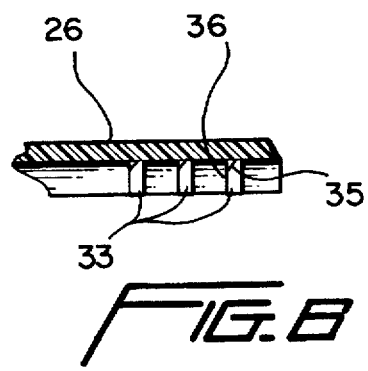
FIG. 8 is a plan view of the opposite side of the second boot half illustrated in FIG. 7.
Figure 7:
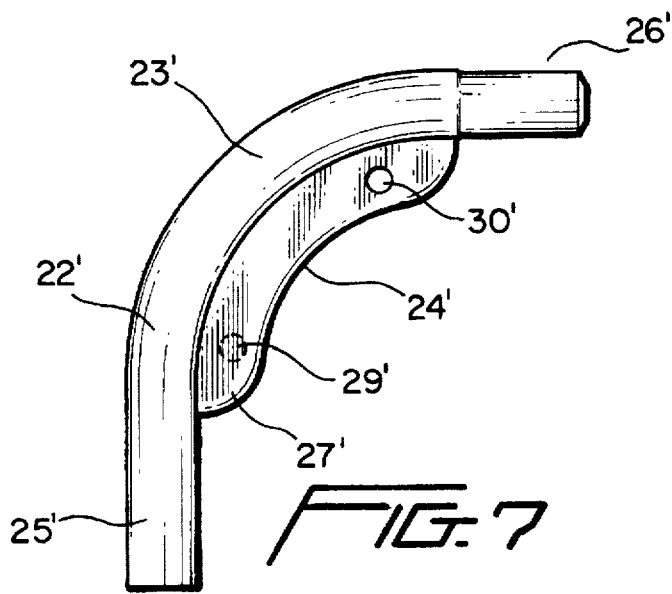
FIG. 7 is a plan view of a second half of the preferred boot.
Figure 11:
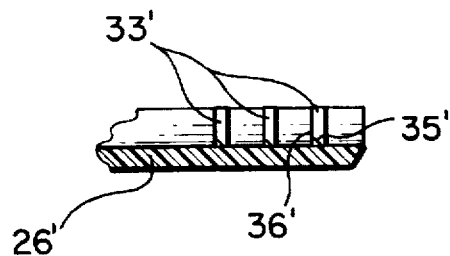
FIG. 11 is a cross-sectional view taken along section B—B of FIG. 8.
Figure 10:
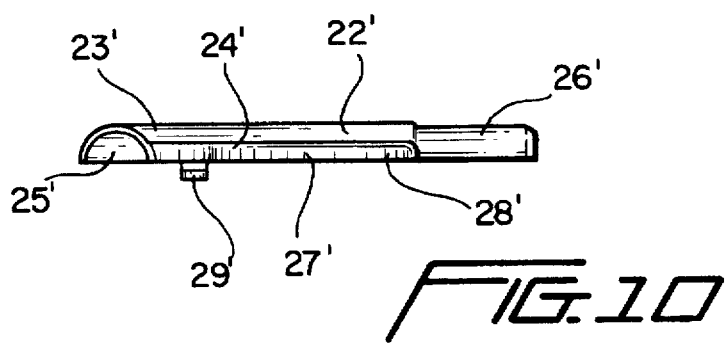
FIGS. 9 and 10 are side views of the second boot half illustrated in FIGS. 7 and 8.
Figure 8:
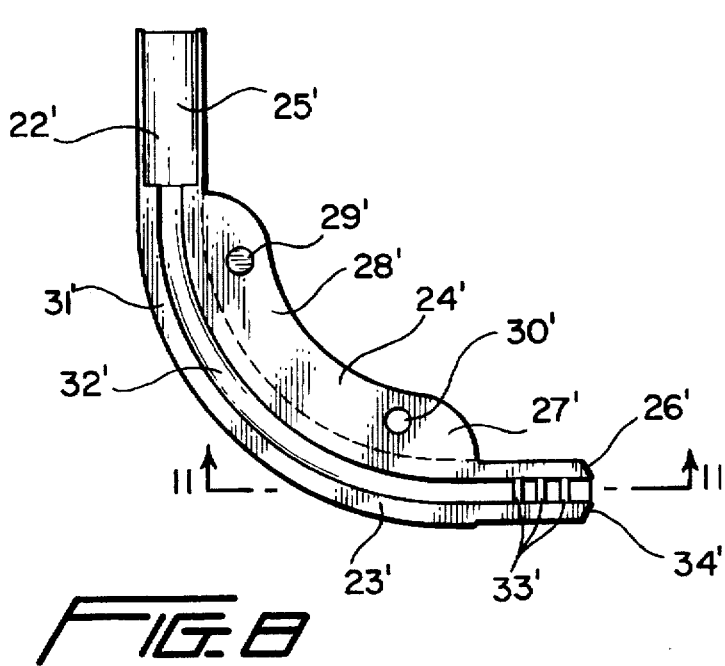
Figure 9:
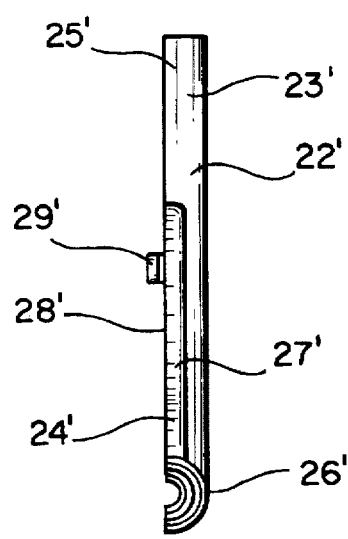

FIG. 1 shows a conventional fiber optic connector 1 that includes an inner body 2 within which the end of a fiber 5 is terminated, an outer housing 3, and a rearwardly projecting ferrule 4. Inner body 2 includes a central passage on the connector axis 6 for receiving an end of cable 7. Outer housing 3 has an inner rectangular cavity 8 which opens at the rear 9 of the connector and into which a conventional resilient boot 12 is inserted.

Those skilled in the art will appreciate that FIG. 1 represents but one type of connector to which the strain relief system of the invention may be applied. Among the numerous conventional optical fiber connectors to which the strain relief system of the present invention may be retrofitted are those designated as SC, FC, ST, and SMA, which include connectors having both rectangular and circular rear sections into which the rigid boot and attachment member of the preferred embodiment of the invention is to be fitted.

Elastomeric boot 12 of the conventional connector is a standard one piece substantially cylindrical member which is fitted over the fiber optic cable before the cable is terminated to the connector and is inserted into the rear opening 8 of the connector upon the completion of termination to provide resistance to bending of the cable. The present strain relief system makes use of this standard elastomeric boot, as will become apparent from the following description, to help secure the two halves of the boot which provides the strain relief in place of the rubber boot. Those skilled in the art will appreciate, however, that the existence of a conventional boot is not essential to the implementation of the present invention, which may be retrofitted onto connectors lacking the conventional boot, or which have other types of strain relief boots.

The boot 21 of the preferred embodiment of the invention is made up of two halves 22 and 22'. Boot halves 22 and 22' are respectively illustrated in FIGS. 2–6 and 7–11 and are preferably made of a relatively rigid plastic. As illustrated, elements of the second boot half are represented by the same reference numerals as those of the first half, except that primes (e.g., 22') are used in FIGS. 7–11 to designate the elements of the second half. In the interest of brevity, the primed elements are not discussed in detail herein, except as necessary for an understanding of the invention. Although the preferred boot halves as illustrated will form a right angle boot, it will be appreciated by those skilled in the art that the so-called "right angle" configuration can support the optical fiber at any desired angle so long as the optical properties of the cable are not affected.

Each of the boot halves includes a cable supporting section 23 and a press fit section 24. The cable supporting section 23 is in turn made up of an enlarged inner diameter connector interface section 25 and a ribbed reduced outer diameter section 26 at a distal end of the boot.

Press fit section 24 is in the form of a flange 27 having a planar interface section 28 arrange to engage a corresponding planar interface section 28' of corresponding flange 27' of second boot half 22'. In the illustrated embodiment, flange 24 includes a projection or press-fit pin 29 and an opening 30 arranged to mate with respective corresponding projection opening 30' and projection 29' in flange 27'. Preferably, the engagement between respective projections 29 and 29' and openings 30 and 30' is a press fit engagement which aligns and secures the halves together upon application of manual pressure. It will be noted by those skilled in the art that, in addition to serving as a support for the press-fit arrangement, flanges 24 and 24' provide the advantage of offering added resistance to lateral bending moments.

The central portion 31 of cable supporting section 23 proximate flange 27 includes a groove or passage 32 having an inner diameter which is approximately equal to an outer diameter of the cable so as to prevent play between the cable and the boot when the two boot halves 22 and 22' are assembled together.

Enlarged inner diameter portion 25 of cable supporting section 23 extends linearly from central portion 31 by an amount sufficient to extend into the boot receiving rear portion 9 of the fiber optic connector. The reason this section of the boot has an enlarged inner diameter is that the enlarged inner diameter potion is intended to fit over a rear portion of the connector inner body which extends into rear portion 9 of the type of connector illustrated in FIG. 1. It will be appreciated by those skilled in the art, however, that if the connector inner body or any other component in the boot receiving portion of the connector has a smaller or larger diameter, the inner diameter of this section of the boot may be varied accordingly, as may the length of this section of the boot.

Reduced outer diameter portion 26 of cable supporting section is designed to accommodate the standard boot illustrated in FIG. 1, which fits over this section to help secure boot halves 22 and 22' together. Preferably, the outer diameter of this section is slightly larger than the inner diameter of the conventional boot so that the boot must be stretched in order to fit over this section. The outer diameter of the remainder of the boot may be substantially equal to the outer diameter of the standard elastomeric boot 12 so as to be flush therewith.

The inner diameter of section 26, which is otherwise identical to the inner diameter of the central portion 31 of the cable receiving section, includes a plurality of ribs 33 which extend into the central passage formed by grooves 34 and 34' of this section of the connector when the two boot halves are assembled together. These ribs have an angled surface 35 and a transverse surface 36 which intersect at a sharp edge to squeeze the cable jacket and offer resistance to pulling the boot away from the cable following installation. The force required to make the ribs squeeze the cable jacket is provided by stretching the standard elastomeric boot 12 over the outer diameter of the section containing the ribs.

The boot described above thus provides, like prior right angle boot, a passage for maintaining a desired curvature of the cable, but instead of being formed in one piece such that it must be placed over the cable before the cable is installed to the connector, the boot is made up of two halves fitted on opposite sides of the cable and held together in part by a press fit arrangement of projections and corresponding openings in a flange extending from the boot, by stretching a standard elastomeric boot 12 over a preferably reduced diameter section of the assembled boot. The opposite end of the boot, described above as having an enlarged inner diameter to fit over the rear of the inner body 2 of the connector, is also clamped together and held in the connector either by the boot clip 40 shown in FIGS. 12 and 13 or the alternative boot clip 50 shown in FIGS. 14 and 15.

Boot clip 40 includes a flange 41 and two arms 42 and 43 extending transversely therefrom. The inner surface 44 of both the flange 41 and arms 42 and 43 are radiused to correspond to the outer surface 45 of the enlarged inner diameter section 25 of boot 21. As is apparent from FIG. 13, flange 41 is generally C-shaped, i.e., it does not extend completely around the boot but rather forms an opening 46 wide enough to at least permit the clip to fit over the cable so as to be in position to be fitted over the boot after the boot has been secured to the cable but before insertion into the connector. The outer surfaces 47 of arms 42 and 43 of clip 40 are shaped to be press fit into the rectangular rear opening 8 of a fiber optic connector of the type shown in FIG. 1, the fully assembled connector and strain relief being shown in FIG. 16, with only flange 41 being visible in the assembled position, the flange serving to define the inward extent to which the clip may be inserted into the connector.

Boot clip 50, like boot clip 40, has a radiused inner surface 51 corresponding to the outer surface 45 of the enlarged inner diameter section 25,25' of boot 21, and is substantially C-shaped in cross-section to form an opening 52 to permit the clip to be fitted over the cable after assembly of the cable to the connector, but unlike boot clip 40, has a curved outer perimeter 53 which permits the clip to fit into a fiber optic connector having a cylindrical coupling member. This alternative clip further includes a notch 54 designed to fit over flange 27,27' so that opening 52 is always some degree off from the "seam" of the two halves 22 and 22'. Those skilled in the art will appreciate that the shape of the exterior of the clip and the presence of projections and the like will depend on the shape of the connector into which the boot of the invention is to be fitted, and that the invention is intended to be adaptable for use with any such connector configuration, regardless of shape.

The strain relief system of the above-described preferred embodiments of the invention is assembled to the connector by first placing clip 40,50 over the rear end of the inner body or crimp ferrule inside the coupling member, assembling the cable into one half 22 or 22' of the boot, placing the other half 22' or 22 of the boot over the first half of the boot without snapping them tight, pulling the boot assembly over the crimp ferrule 4 inside the clip until it seats, snapping or press-fitting the two halves 22 and 22' of the boot assembly together, and sliding the standard boot 12 onto the distal reduced outer diameter portion 26,26' of the boot assembly to cause the fibs 33,33' to squeeze the cable jacket 11 and secure the boot to the cable, thus completing assembly of the strain relief system to the connector.

Figure 16:
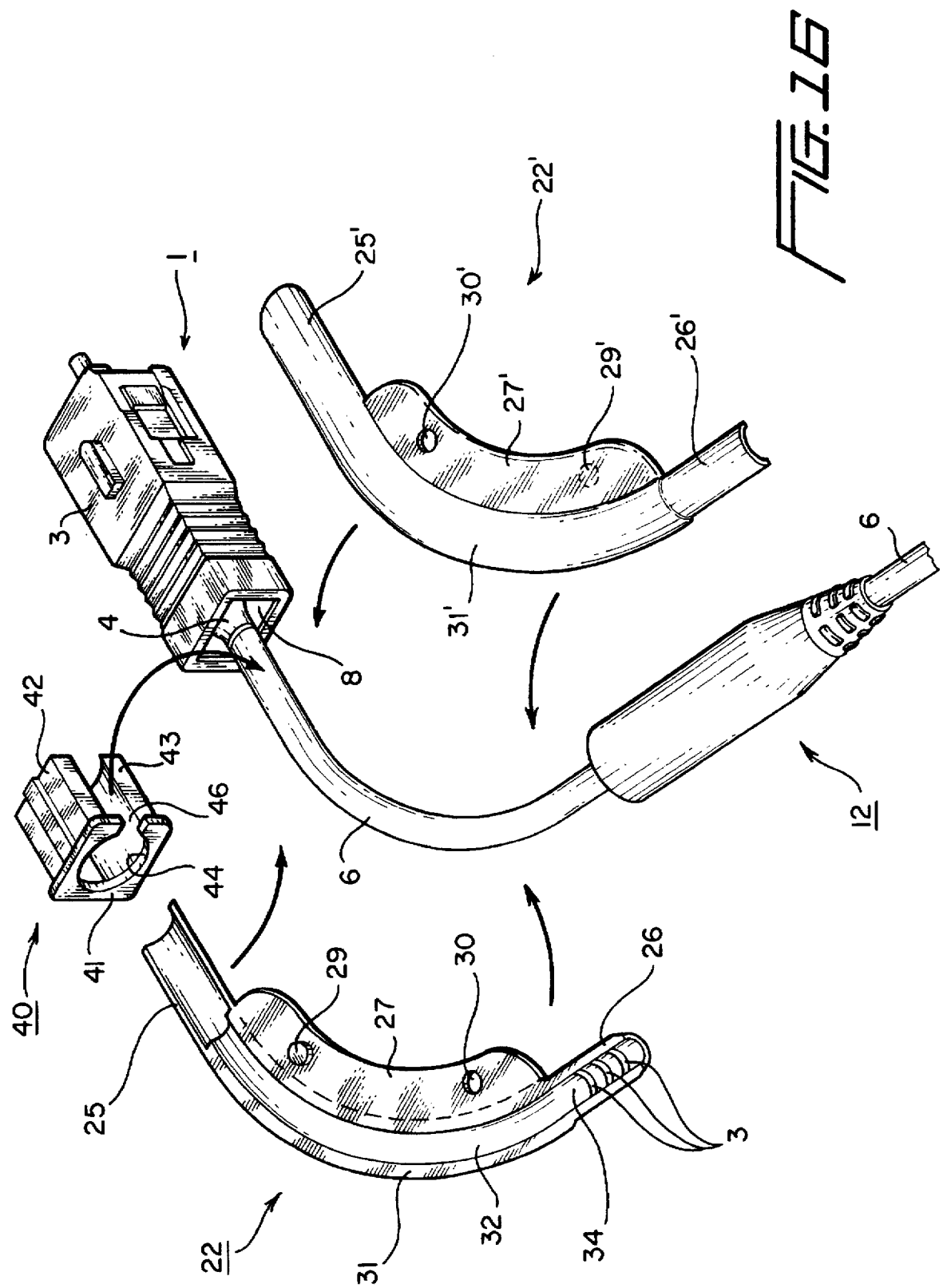
FIG. 16 is a perspective view showing the manner in which the preferred strain relief system is installed on a connector of the type shown in FIG. 1.
Figure 17:
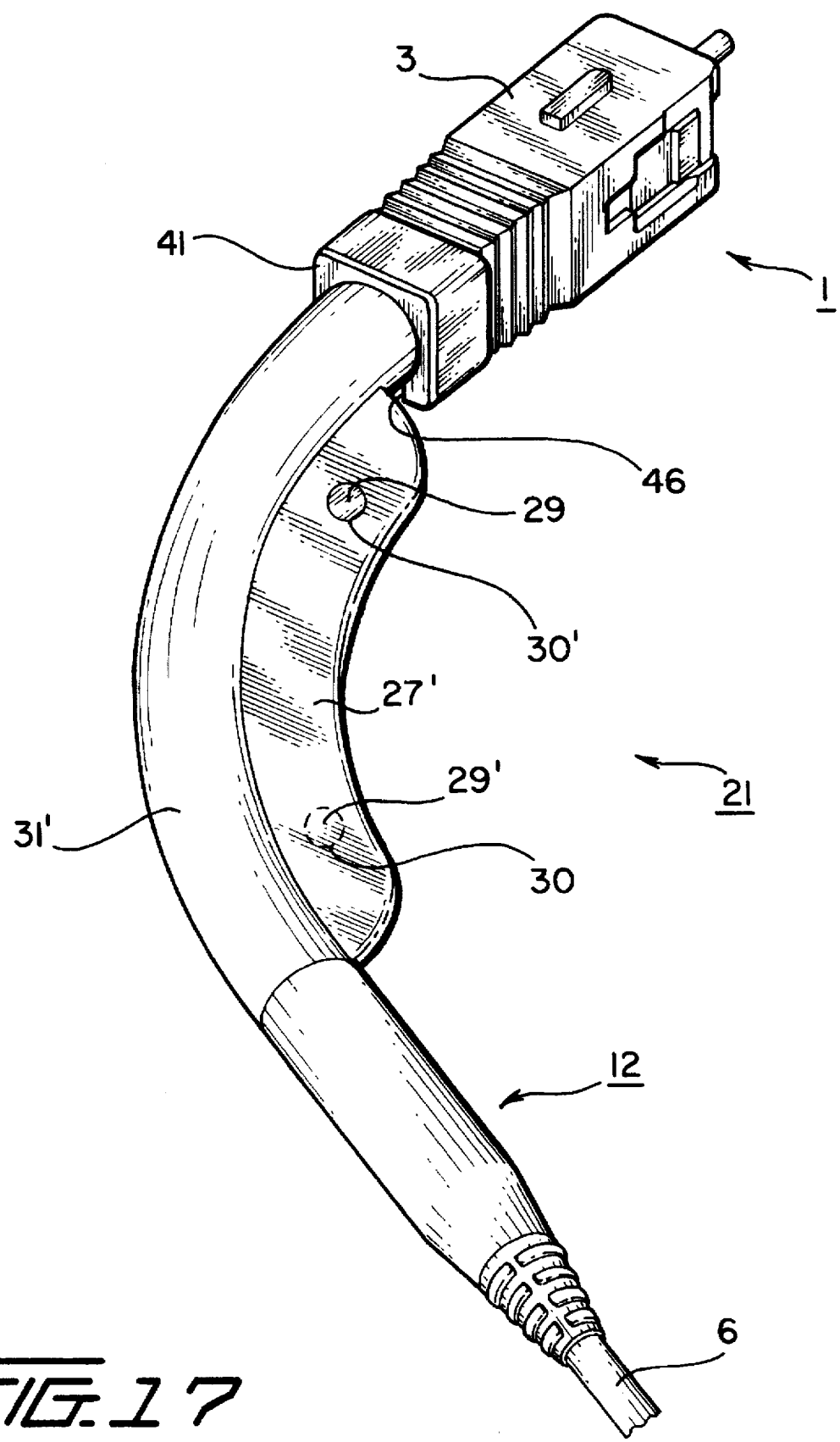
FIG. 17 is a perspective view showing an installation of the preferred strain relief system on the connector of FIG. 1.

Because clips 40 and 50 are both used with the same basic boot design, those skilled in the art will appreciate that clips 40 and 50 serve as adapters allowing the same basic boot design illustrated in FIGS. 2–9 to be used both with the connector illustrated in FIGS. 1, 16, and 17, and with connector configurations in which the cross-section is, for example, circular (an example of the latter type of connector is illustrated in U.S. Pat. No. 5,073,044), even when retrofitting is not necessary. As a result, while the illustrated embodiments which permit the strain relief to be retrofitted onto existing installations are highly advantageous, it is also within the scope of the invention to provide a clip with a continuous outer profile and which therefore cannot be snapped onto a cable but rather must be fitted over the cable before termination of the cable to the connector. In order to illustrate this point, a the opening 52 in FIG. 14 is shown in dashed line, although those skilled in the art will appreciate that clip 40 shown in FIG. 13 could be similarly modified.

Having thus described a preferred embodiment of the invention, however, the inventors recognize that numerous variations of the preferred embodiment will undoubtedly occur to those skilled in the art, and intend that the invention be defined to include all such variations and modifications.

In particular, the shape of the portions of the boot and clip which interface with the connector and the elastomeric boot may be freely varied to accommodate variations in the shape of the connector and boot. In addition, the principles of the invention may find application in connectors other than fiber optic connectors, and certainly in fiber optic connectors which differ from those illustrated. Consequently, it is intended that the invention not be limited by the above description or drawings, but that it be limited only by the appended claims.

We claim:

1. A strain relief system for a connector, comprising:
   an essentially rigid boot made up of two halves in the form of discrete members which, when assembled together around a cable, define a central passage through which the cable extends;
   means for aligning and securing together the two halves of the boot; and
   a clip which fits over one end of the boot and which includes an opening for permitting the clip to be fitted over the cable even after the cable has been terminated to the connector, said clip including a portion arranged to extend into an opening in the connector to hold together said two halves at one end and to retain said one end in said opening, said clip having an outer profile which is arranged to correspond to the inner profile of the connector into which the boot is to be fitted.

2. A strain relief system as claimed in claim 1, wherein the essentially rigid boot is arranged to receive at its distal end an elastomeric boot which is fitted over an outer surface of the distal end to hold together the two halves of the boot at the distal end.

3. A strain relief system as claimed in claim 2, wherein said means for aligning and securing together the two halves comprises, on a first of the two halves, a flange having at least one opening and, on a second of the two halves, a flange having at least one projection, said projection being arranged to be press-fit into said opening.

4. A strain relief system as claimed in claim 3, wherein said clip includes a flange and two arms each having a radiused inner surface corresponding to an exterior surface of said boot, said arms having an outer surface which corresponds in shape to a shape of an interior surface of the connector which receives the arms, said flange defining an inner extent of travel of said clip into the connector.

5. A strain relief system as claimed in claim 4, wherein the essentially rigid boot includes ribs extending into the central passage and arranged to squeeze a jacket of the cable to prevent movement of the boot relative to the cable.

6. A strain relief system as claimed in claim 2, wherein said clip includes a flange and two arms each having a radiused inner surface corresponding to an exterior surface of said boot, said arms having an outer surface which corresponds in shape to a shape of an interior surface of the connector which receives the arms, said flange defining an inner extent of travel of said clip into the connector.

7. A strain relief system as claimed in claim 2, wherein said distal end has a reduced diameter such that when the elastomeric boot is placed over the distal end, the elastomeric boot is flush with an outer surface of the remainder of the boot.

8. A strain relief system as claimed in claim 1 wherein the essentially rigid boot includes ribs extending into the central passage and arranged to squeeze a jacket of the cable to prevent movement of the boot relative to the cable.

9. A strain relief system as claimed in claim 2, further comprising an elastomeric boot which is fitted over an outer surface of a distal end of the essentially rigid boot, said elastomeric boot supplying pressure to cause the ribs to squeeze the cable jacket.

10. A strain relief system as claimed in claim 1, wherein said means for aligning and securing together the two halves comprises, on a first of the two halves, a flange having at least one opening and, on a second of the two halves, a flange having at least one projection, said projection being arranged to be press-fit into said opening.

11. A strain relief system as claimed in claim 1, wherein said boot includes an inner diameter section arranged to fit over a rear end of an inner body in said connector and on which the clip is positioned.

12. A strain relief system as claimed in claim 1, wherein said clip includes a flange and two arms each having a radiused inner surface corresponding to an exterior surface of said boot, said arms having an outer surface which corresponds in shape to a shape of an interior surface of the connector which receives the arms, said flange defining an inner extent of travel of said clip into the connector.

13. A strain relief system as claimed in claim 12, wherein said outer surface of said arms is substantially planar.

14. A strain relief system as claimed in claim 1, wherein said clip is substantially cylindrical in shape.

15. A strain relief system for a connector, comprising:
   an essentially rigid boot made up of two halves in the form of discrete members which, when assembled together around a cable, define a central passage through which the cable extends;
   means for aligning and securing together the two halves of the boot; and
   a clip member which fits over one end of the boot and which includes a portion arranged to fit with an opening in the connector to hold together said two halves at one end and to retain said one end in said opening, said clip having an outer profile which is arranged to correspond to the inner profile of the connector into which the boot is to be fitted.

16. A strain relief system as claimed in claim 15, wherein the essentially rigid boot includes ribs extending into the central passage and arranged to squeeze a jacket of the cable to prevent movement of the boot relative to the cable.

17. A strain relief system as claimed in claim 16, further comprising an elastomeric boot which is fitted over an outer surface of a distal end of the essentially rigid boot, said elastomeric boot supplying pressure to cause the ribs to squeeze the cable jacket.

18. A strain relief system as claimed in claim 15, wherein the essentially rigid boot is arranged to receive at its distal end an elastomeric boot which is fitted over an outer surface of the distal end to hold together the two halves of the boot at the distal end.

19. A strain relief system as claimed in claim 18, wherein said clip member includes a flange and two arms each having a radiused inner surface corresponding to an exterior surface of said boot, said arms having an outer surface which corresponds in shape to a shape of an interior surface of the connector which receives the arms, said flange defining an inner extent of travel of said clip member into the connector.

20. A strain relief system as claimed in claim 18, wherein said distal end has a reduced diameter such that when the elastomeric boot is placed over the distal end, the elastomeric boot is flush with an outer surface of the remainder of the boot.

21. A strain relief system as claimed in claim 15, wherein said means for aligning and securing together the two halves comprises, on a first of the two halves, a flange having at least one opening and, on a second of the two halves, a flange having at least one projection, said projection being arranged to be press-fit into said opening.

22. A strain relief system as claimed in claim 21, wherein said clip member includes a flange and two arms each having a radiused inner surface corresponding to an exterior surface of said boot, said arms having an outer surface which corresponds in shape to a shape of an interior surface of the connector which receives the arms, said flange defining an inner extent of travel of said clip member into the connector.

23. A strain relief system as claimed in claim 22, wherein the essentially rigid boot includes ribs extending into the central passage and arranged to squeeze a jacket of the cable to prevent movement of the boot relative to the cable.

24. A strain relief system as claimed in claim 15, wherein said means for aligning and securing together the two halves comprises, on a first of the two halves, a flange having at least one opening and, on a second of the two halves, a flange having at least one projection, said projection being arranged to be press-fit into said opening.

25. A strain relief system as claimed in claim 15, wherein said boot includes an inner diameter section arranged to fit over a rear end of an inner body in said connector and on which the clip member is positioned.

26. A strain relief system as claimed in claim 15, wherein said clip member includes a flange and two arms each having a radiused inner surface corresponding to an exterior surface of said boot, said arms having an outer surface which corresponds in shape to a shape of an interior surface of the connector which receives the arms, said flange defining an inner extent of travel of said clip member into the connector.

27. A strain relief system as claimed in claim 26, wherein said outer surface of said arms is substantially planar.

28. A strain relief system as claimed in claim 15, wherein said clip member is substantially cylindrical in shape.

29. A strain relief system as claimed in claim 15, wherein an outer profile of said clip member is substantially square.

30. A strain relief system as claimed in claim 15, wherein an outer profile of said clip member is substantially circular.

31. A strain relief system as claimed in claim 15, wherein said clip member has a continuous outer profile.

* * * * *

UNITED STATES PATENT AND TRADEMARK OFFICE
CERTIFICATE OF CORRECTION

PATENT NO. : 5,710,851
DATED : Jan. 20, 1998
INVENTOR(S) : Walter et al.

It is certified that error appears in the above-identified patent and that said Letters Patent is hereby corrected as shown below:

Column 2, line 33, change "sells," to --skills,--.
Column 6, line 16, change "25,25'" to --25, 25'--;
         line 23, change "27,27'" to --27, 27'--;
         line 33, change "40,50" to --40, 50--;
         line 41, change "26,26'" to --26, 26'--;
         line 42, change "fibs 33,33'" to --ribs 33, 33'--; and
         line 60, delete "the".

Signed and Sealed this

Twelfth Day of May, 1998

Attest:

BRUCE LEHMAN

Attesting Officer      Commissioner of Patents and Trademarks